(12) United States Patent
Kanevsky et al.

(10) Patent No.: US 7,233,809 B2
(45) Date of Patent: Jun. 19, 2007

(54) EFFICIENT COMMUNICATION WITH PASSIVE DEVICES

(75) Inventors: Dimitri Kanevsky, Ossining, NY (US); Mariusz Sabath, Scarsdale, NY (US); Jan Sedivy, Praha (CZ); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 10/998,466

(22) Filed: Nov. 29, 2004

(65) Prior Publication Data

US 2005/0096070 A1   May 5, 2005

Related U.S. Application Data

(63) Continuation of application No. 09/680,711, filed on Oct. 6, 2000, now Pat. No. 6,862,454.

(51) Int. Cl.
   *H04B 1/38* (2006.01)
(52) U.S. Cl. .................. 455/557; 455/556.2; 455/41.2; 368/10; 368/13; 700/83
(58) Field of Classification Search ................ 455/557, 455/556.2, 41.2; 368/10, 13; 700/17, 83
   See application file for complete search history.

(56) References Cited

U.S. PATENT DOCUMENTS

| | | | |
|---|---|---|---|
| 5,247,700 A | 9/1993 | Whol et al. | |
| 5,712,619 A | 1/1998 | Simkin | |
| 5,737,707 A | 4/1998 | Gaulke et al. | |
| 5,742,905 A | 4/1998 | Pepe et al. | |
| 5,796,338 A | 8/1998 | Mardirossian | |
| 5,797,097 A | 8/1998 | Roach, Jr. et al. | |
| 5,812,930 A * | 9/1998 | Zavrel ........................ | 725/62 |
| 5,950,128 A | 9/1999 | Ghisler | |
| 6,018,657 A | 1/2000 | Kennedy, III et al. | |
| 6,100,806 A | 8/2000 | Gaukel | |
| 6,263,218 B1 | 7/2001 | Kita | |
| 6,272,359 B1 | 8/2001 | Kivela et al. | |
| 6,359,837 B1 * | 3/2002 | Tsukamoto ................... | 368/10 |
| 6,477,117 B1 * | 11/2002 | Narayanaswami et al. .. | 368/251 |
| 6,535,461 B1 * | 3/2003 | Karhu ......................... | 368/10 |
| 6,556,222 B1 * | 4/2003 | Narayanaswami .......... | 715/786 |
| 6,577,849 B1 * | 6/2003 | Eaton et al. ................ | 455/3.01 |

(Continued)

FOREIGN PATENT DOCUMENTS

JP      10-004579      1/1998

(Continued)

*Primary Examiner*—Danh Le
(74) *Attorney, Agent, or Firm*—Ohlandt, Greeley, Ruggiero & Perle, L.L.P.; Daniel P. Morris, Esq.

(57) ABSTRACT

A system and method that provides data messages to a passive device. A passive device, for example watch, is registered together with the telephone number of a cellular telephone of a subscriber to the data message service. Since the cellular telephone periodically transmits a beacon signal, the wireless network knows its cell location. Accordingly, the system determines the cell location of the cellular telephone and establishes a communication of the subscribed data to the watch via the local cellular provider for the same cell location as that of the subscriber's cellular telephone.

6 Claims, 4 Drawing Sheets

U.S. PATENT DOCUMENTS 6,678,535 B1 * 1/2004 Narayanaswami .......... 455/557
6,775,558 B1 * 8/2004 Ranta et al. ................. 455/557
6,832,116 B1 * 12/2004 Tillgren et al. ................ 700/1

FOREIGN PATENT DOCUMENTS

| KR | 1999-0075711 | 10/1999 |
| WO | WO 90/13989 | 11/1990 |
| WO | WO 96-08933 | 3/1996 |
| WO | WO 99/01995 | 1/1999 |

* cited by examiner

EFFICIENT COMMUNICATION WITH PASSIVE DEVICES

This Application is a continuation of U.S. patent application, Ser. No. 09/680,711, which was filed on Oct. 6, 2000 now U.S. Pat.No. 6,862,454.

This invention relates to communication of information over a network to a passive device that has a capability only to receive the information and no capability to transmit information via the wireless network. For example, the passive device may be a watch, a pager or beeper, a pen and the like that has a receiver, a control and a display. The information may be a stock price, the weather, a personal calendar appointment, news, email and the like.

BACKGROUND OF THE INVENTION

An active cellular device, such as a telephone, a beeper and the like, sends a beacon signal on a periodic basis. Local cellular providers that receive the beacon signal can determine the cell location of the active device. Generally, the cellular provider that receives the signal with the greatest signal strength of power becomes the provider of the cellular service to the active device. The cellular provider sends the address of the active cell device to a central database. When a call is placed to the active device, the central database is accessed to find the most recent cell location of the active device. A wireless telephone connection is then made to the active device via the local service provider for that cell, provided the active device has not moved or stopped sending beacon signals. Because active cellular devices are locatable, they are capable of receiving and displaying data messages of various content, such as weather, news, sports scores, business data, and the like.

There is a class of passive device, such as a pen, a watch, a picture frame, a non-cellular telephone, a wallet and the like, that is incapable of being locatable because they lack a transmitter for sending a beacon or other signal by which they could be located. Accordingly, passive devices are not currently used for the communication of data messages.

There exists a need to provide a data service of data messages to a passive device, for example a watch, of a subscriber.

SUMMARY OF THE INVENTION

The present invention satisfies this need by associating a user's passive device, such as a watch, with the user's cellular phone. A data message, for example stock quotes, is formed for transmission to the subscriber's passive device. The identity of a local cellular service provider that has control over communications in a cell location in which the user's cellular telephone is currently located is determined. The identity of the cellular telephone with which the passive device is associated is determined and used to obtain the identity of the local cellular service provider. The data message is then presented to the local cellular service provider for transmission to the passive device.

The identities of the cellular telephone and the local service provider may be kept in one or more databases. The passive device is a member of the group consisting of: a watch, a pen, a telephone, a frame, a wallet, and a beeper.

A passive device according to another aspect of the invention includes a personal article that has a display, a receiver capable of receiving a data message via a wireless transmission and a transmitter capable of transmitting an identity message only a short distance to a cellular device. A controller processes the data message for display on the display and transmission of the identity message by the transmitter.

BRIEF DESCRIPTION OF DRAWING

Other and further objects, advantages and features of the present invention will be understood by reference to the following specification in conjunction with the accompanying drawings, in which like reference characters denote like elements of structure and.

DETAILED DESCRIPTION OF THE INVENTION

Figure 1:
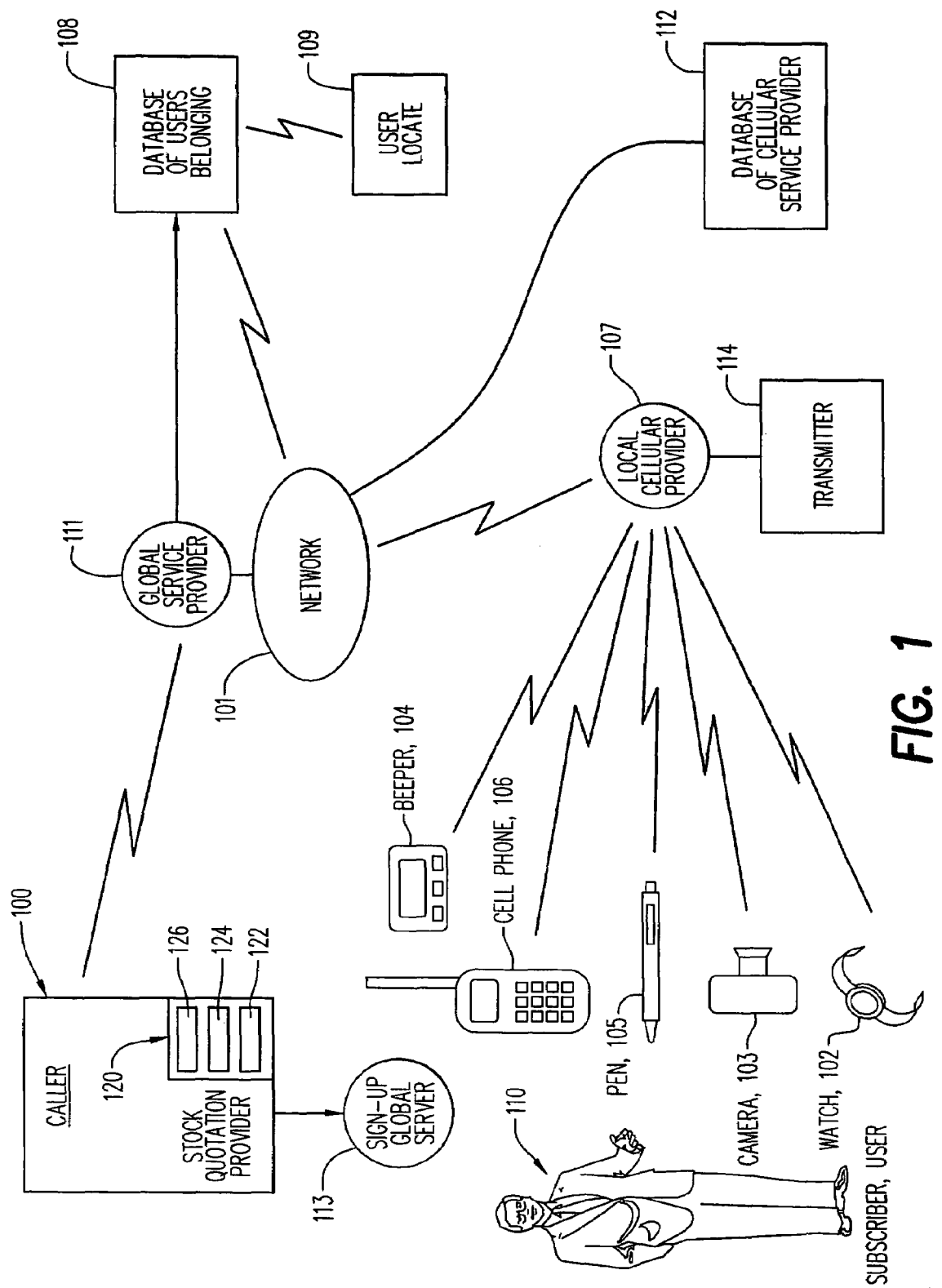
FIG. 1 depicts a communication system in which communication can be established with passive devices according to the present invention.

Referring to FIG. 1, a data service provider 100 provides data to a subscriber user 110 via a local cellular provider 107. The data is any suitable data that subscriber user 100 wants to obtain. For example, the data may be stock quotations, weather, news, email and the like. The data is transmitted to a passive device, such as a watch 102, a camera 103, a beeper 104, a pen or other suitable device.

As used herein, a passive device is passive in the sense that it has a receiver that can receive data sent to it over a network, but has no transmitter that can transmit data to the network. The passive device also includes a display and a controller, such as, a microcomputer that processes the received data for presentation to the display.

According to the present invention, a passive device, for example watch 102, is registered together with the telephone number of a cellular telephone 106 of subscriber user 110. Since cellular telephone 106 periodically transmits a beacon signal, the wireless network knows its cell location. Accordingly, the process of the present invention establishes a communication of the subscribed data to watch 102 via the local cellular provider for the same cell location as that of cellular telephone 106 of subscriber 110.

Data service provider 100 includes a computer 120. Computer 120 includes a memory 122, a data service procedure 124 and a communication interface 126. Computer 120 under the control of data service procedure 124 communicates via communication interface 126 with other devices via a network 101.

When data service provider 100 needs to send data, e.g., a stock quotation, to watch 102, it accesses one or more databases to determine the type of passive device (watch in this example), to which the stock quotation is being sent, the telephone number of cellular phone 106 for which the watch is registered and the identity of the local cellular service provider for the current cell location of cellular telephone 106. Thus, data service provider 100 sends an inquiry to a global service provider 111 via network 101. The inquiry identifies subscriber user 110 by name and requests the cell location of cellular phone 106 that is associated with watch 102 and the local service provider for that cell location.

Global service provider 111 accesses a database 108 of subscribers for a list of passive devices registered for subscriber user 110 and the cellular phone number associated with watch 102 of subscriber user 110. Global service provider 111 uses a cell location module 109 to obtain via network 101 from a cell location/cellular service provider database 112 the cell location of and a local cellular service provider 107 for that cell location. Global service provider 111 replies to data service provider 100 with all of this data. Data service provider 100 then sends the stock quotation data to local service provider 107 that, in turn, transmits such data via an associated transmitter 114 to watch 102.

Network 101 is global in the sense that it includes all modes of communication services, such as, telephone service (wired or wireless), Internet, World Wide Web, Global Positioning System and other suitable services known currently or in the future. For example, communications from local service provider 107 to passive devices 102-105 may be transmitted via a wireless telephone service, while all other communications can be made via telephone service, the Internet, the World Wide Web, Global Positioning System or any combination thereof.

A sign-up global server 113 serves all data service providers 100. Sign-up global service provider 113 contains a registry of subscribers and their passive devices upon which subscribed data is to be received. Data service provider 100 determines from sign-up global server provider 113 to which passive device the stock quotation is be sent.

Figure 2:
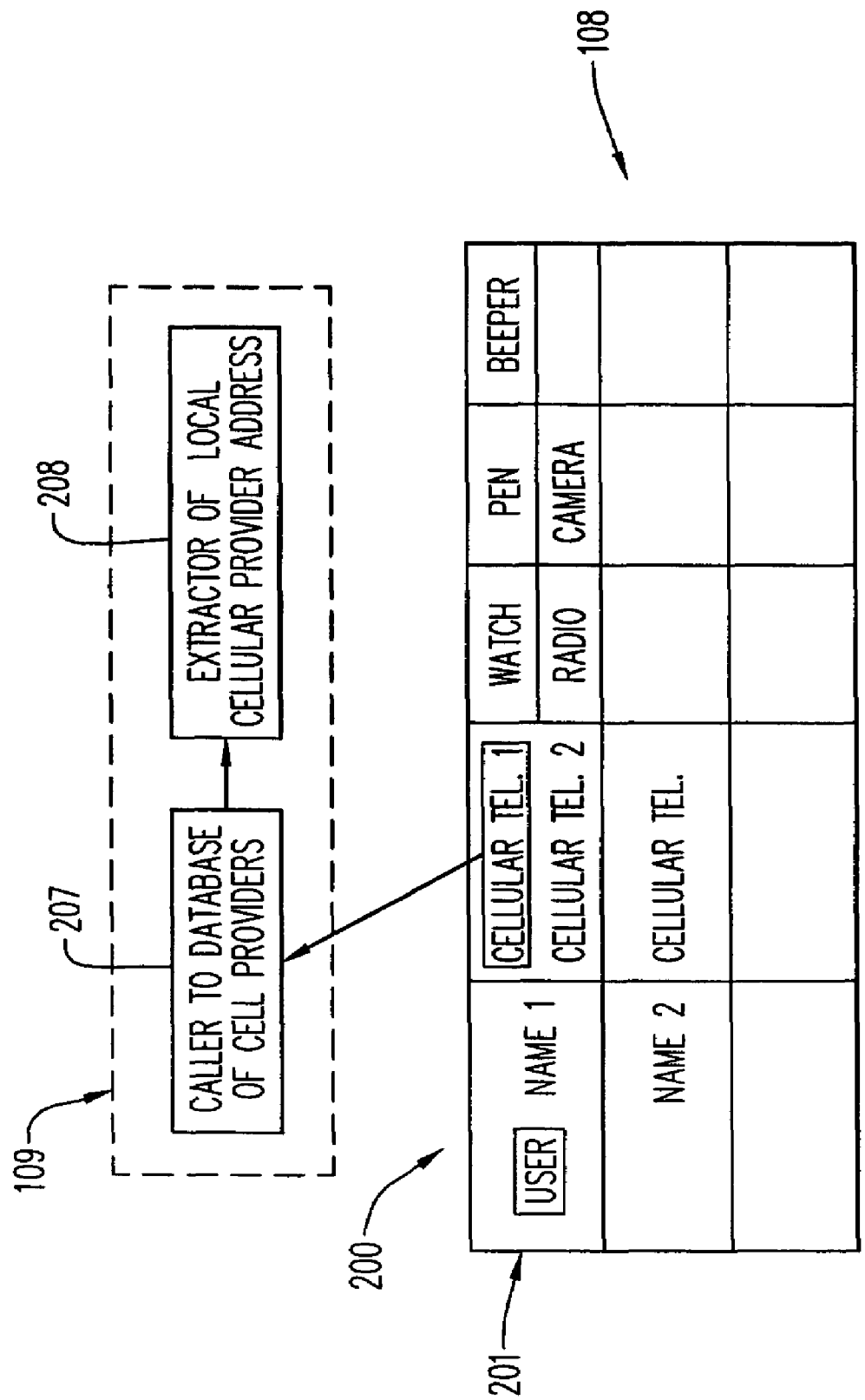
FIG. 2 depicts a data structure for the member user database of FIG. 1.

Referring to FIG. 2, database 108 includes a data structure 200 that contains for each subscriber user a listing of each cellular registered telephone 203 by telephone number and passive devices assigned to each cellular telephone. For example, row 201 shows that a watch, a pen and a beeper are assigned to cellular telephone 1 and that a radio and a camera are assigned to cellular telephone 2. Upon matching watch 102 to cellular telephone 1, global service provider 111 then uses module 109 to obtain the cell location and local cellular provider for that cell location from cellular telephone/cellular service database 112. Module 109 includes two processes 207 and 208. Process 207 establishes a communication via network 101 with cellular telephone database 112. Process 208 extracts or obtains from cellular telephone database 112 the cell location of cellular telephone 106 and/or the identity of local cellular provider 107 that has control over wireless communications with devices in that cell location. The identity includes an address or telephone number to establish a communication to local cellular provider 107. All of this data is sent to data service provider 100.

Figure 3:
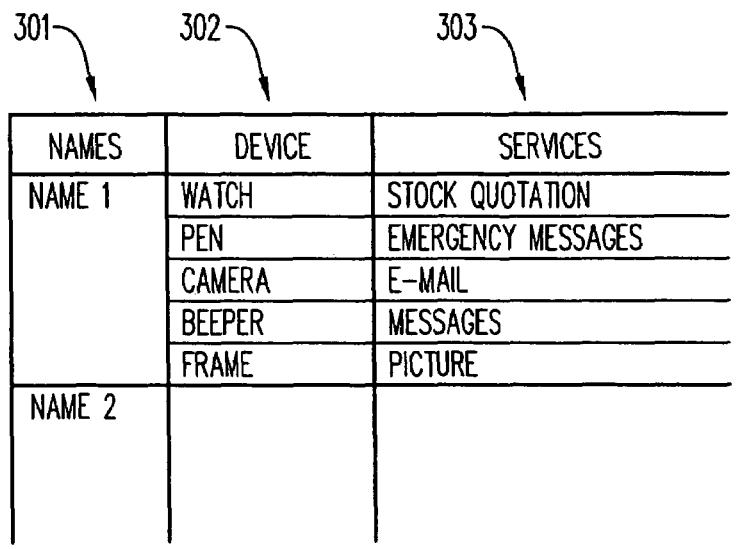
FIG. 3 depicts a data structure for the sign up global service of FIG. 1.

Referring to FIG. 3, a data structure 300 for sign-up global server 113 includes a table that correlates subscriber names with registered passive devices and services to be supplied to those devices. Data service provider 100 uses data structure 300 when forming an inquiry to global service provider 111. A column 301 contains the names of subscriber users: user1 user2, etc. A column 302 has a description of what kind of passive devices each user has. For example, user1 has a watch, a pen, a camera, a beeper and a frame. A column 303 shows what services are provided for each passive device. For example, a watch will receive a stock quotation, a pen will receive urgent messages, a camera will receive e-mail, a beeper will receive messages, and a frame will receive a picture.

Figure 4:
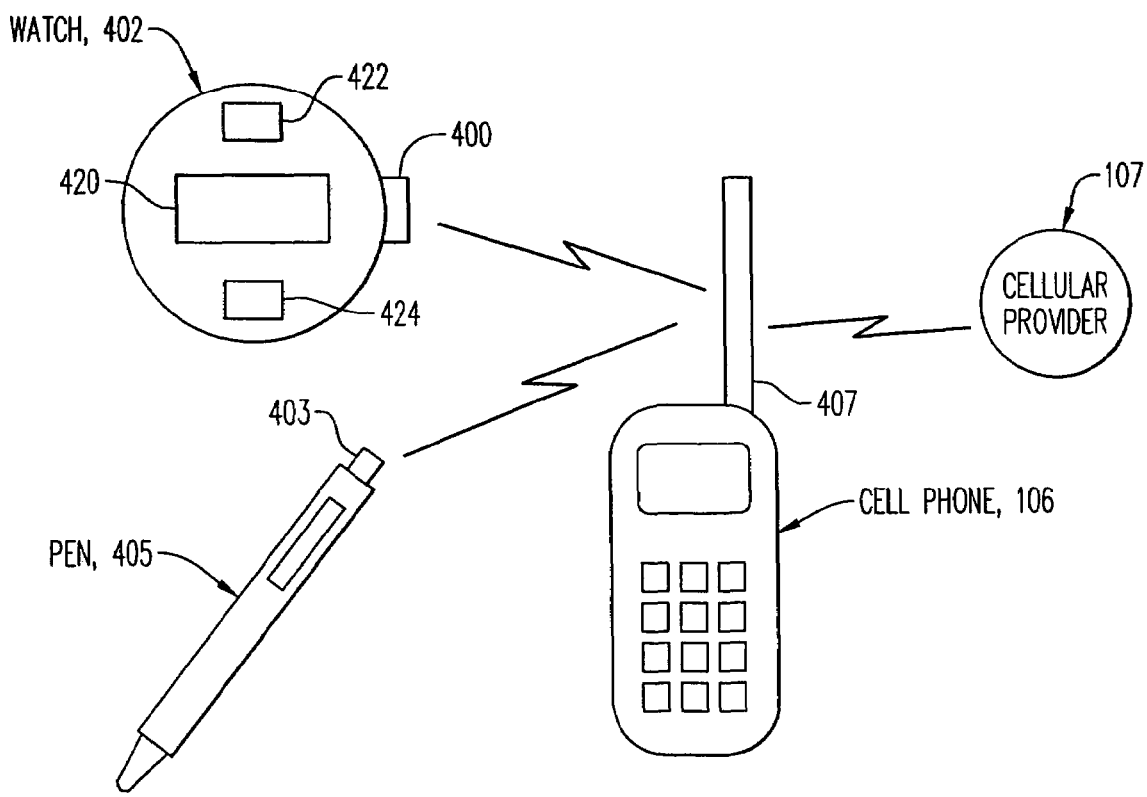
FIG. 4 is a system diagram that depicts an alternative way of transmitting information from a passive device.

Referring to FIG. 4, a passive device according to the invention includes a low power transmitter that is capable of transmitting its identity to a nearby cellular phone, but is incapable of transmitting directly to sign-up global server provider 113. For example, a watch 402 includes a transmitter 400, a display 420, a microcomputer 422 and a receiver 424. Microcomputer 422 processes messages received by receiver 424 from local cellular provider 107 for presentation on display 420. Microcomputer 422 also controls the transmission of the identity message via transmitter 400. A pen 405 includes a transmitter 403 and, though not shown, a display, a receiver and a microcomputer. Transmitters 400 and 403 are low power transmitters capable of transmitting only short distance. For this purpose, the transmission range is from about a foot to about 100 feet. The transmitted signals are received by cellular telephone 106. For example, the signal from watch 402 identifies that its location is in close proximity to cellular telephone 106. Cellular telephone 106 through a transmitter 407 then sends the information to cellular provider 107 that there is a watch in close proximity to cellular telephone 106. Local cellular provider 107 then sends this information to database 108. This procedure eliminates a need to register the passive devices with sign-up global service provider 113.

Figure 5:
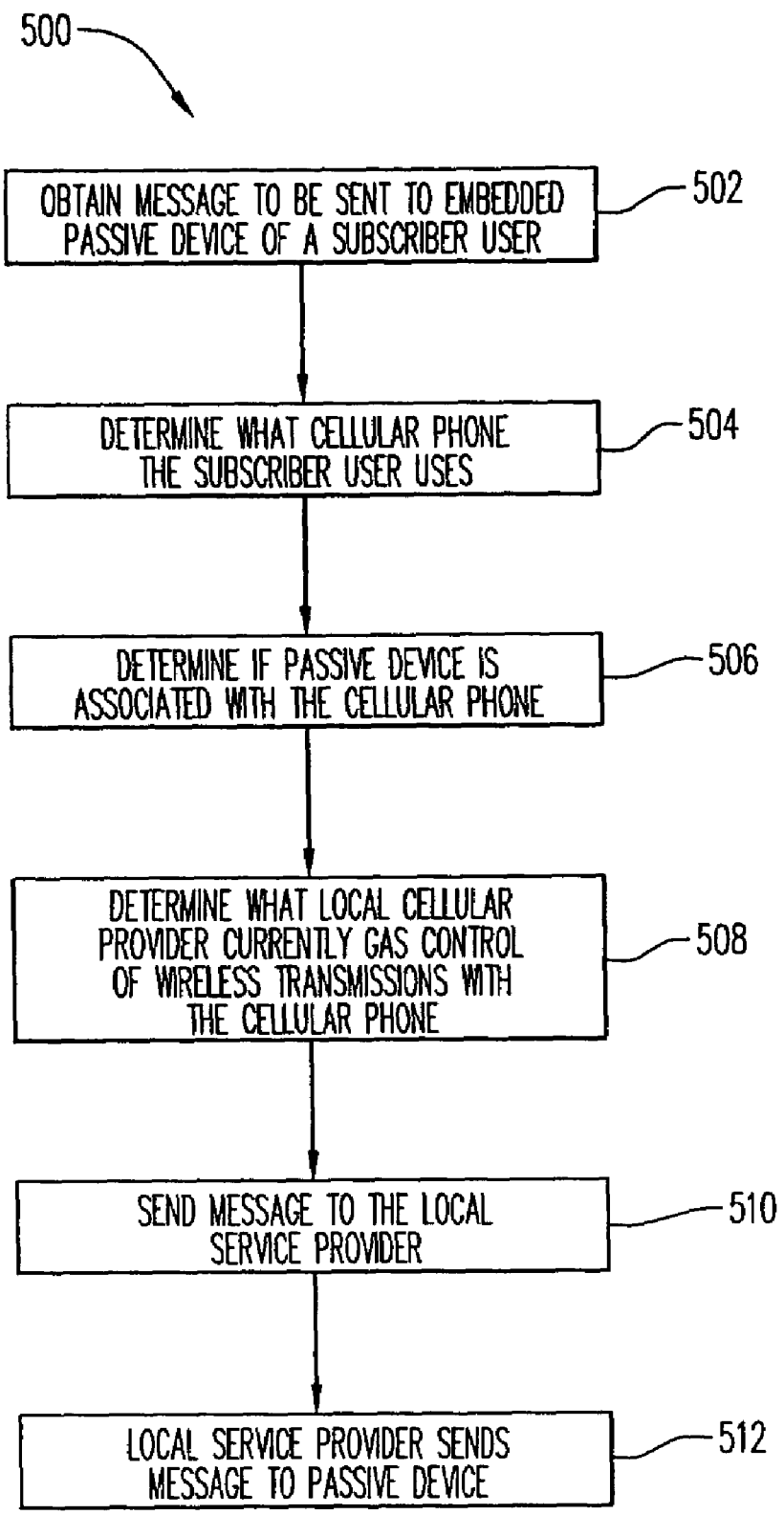
FIG. 5 is a flow diagram of a process that establishes communication with a passive device according to the invention.

Referring to FIG. 5, a procedure 500 according to the invention begins with step 502 in which data service provider 100 obtains the message (e.g., stock quotation) to be sent to a passive device (e.g., watch 102) of user 110. Next, step 504 determines what cellular telephone that user 110 uses from database 108. Step 506 determines if this passive device is associated with a cellular telephone. Step 508 then determines what local cellular provider currently has control over wireless transmissions to cellular telephone 106. If no, then step 510 sends the stock quotation message to the local cell provider. At step 512, the local cell provider transmits the stock quotation message to watch 102.

The present invention having been thus described with particular reference to the preferred forms thereof, it will be obvious that various changes and modifications may be made therein without departing from the spirit and scope of the present invention as defined in the appended claims.

What is claimed is:

1. A passive device comprising a personal article that has a display, a receiver capable of receiving data via a wireless transmission from a local service provider of a communication system, a transmitter that has a transmission range that includes a nearby active device, but not said local service provider, and that is capable of transmitting an identity message to said active device that includes an identity of said passive device, and a controller for processing said data for display on said display and said transmission of said identity message by said transmitter.

2. The passive device of claim 1, wherein transmission range is from about zero foot to about 100 feet.

3. The passive device of claim 1, wherein said personal article is selected from the group consisting of: a watch, a pen, a telephone, a frame, a wallet, and a beeper.

4. The passive device of claim 1, wherein said local service provider is a cellular service provider and said active device is a cellular telephone.

5. The passive device of claim 4, wherein said identity message notifies said cellular telephone that said passive device is within said transmission range.

6. The passive device of claim 5, wherein said cellualr telephone notifies said local service provider that said passive device is nearby said cellular telephone.

* * * * *